United States Patent [19]

Kawamoto et al.

[11] 3,888,969

[45] June 10, 1975

[54] ANTIOXIDANT FOR THE AQUEOUS SOLUTIONS OF SULFITE AND/OR BISULFITE OF SODIUM OR POTASSIUM AND PROCESS FOR PREVENTING THE OXIDATION OF SAID AQUEOUS SOLUTION

[75] Inventors: Kensuke Kawamoto; Tomoaki Tsuno; Teruo Namiki, all of Kitakyushu, Japan

[73] Assignee: Mitsubishi Chemical Industries Ltd., Tokyo, Japan

[22] Filed: Sept. 5, 1972

[21] Appl. No.: 286,559

[52] U.S. Cl. .................. 423/243; 423/269
[51] Int. Cl. ............................ C01b 17/00
[58] Field of Search ............ 423/242–244, 423/265, 269; 260/966, 967, 612 R, 410.7

[56] References Cited
UNITED STATES PATENTS
2,325,076   7/1943   Reuter ........................ 260/967
FOREIGN PATENTS OR APPLICATIONS
1,050,994   12/1966   United Kingdom............... 260/967

Primary Examiner—Oscar R. Vertiz
Assistant Examiner—Gregory A. Heller
Attorney, Agent, or Firm—Bierman & Bierman

[57] ABSTRACT

An antioxidant for the aqueous solution of sulfite and-/or bisulfite of sodium or potassium which comprises at least one compound selected from the group consisting of 1. substituted phenols represented by the formula:

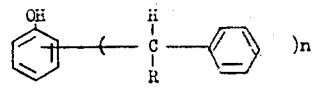

wherein R is a lower alkyl group and n is an integer from 1 to 5.

2. tris (alkylphenyl) phosphates represented by the formula:

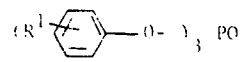

wherein $R^1$ is an alkyl group having 6–18 carbon atoms.

3. trialkyl phosphites represented by the formula:

$$(R^2 - O - )_3 P$$

wherein $R^2$ is an alkyl group having 8–18 carbon atoms.

4. glycerin monofatty acid esters represented by the formula:

$$R^3 \cdot COOCH_2CH(OH)CH_2OH$$

wherein $R^3$ is an alkyl group having 8–22 carbon atoms.

and a process for preventing the oxidation of said aqueous solution which comprises employing said antioxidant.

10 Claims, 1 Drawing Figure

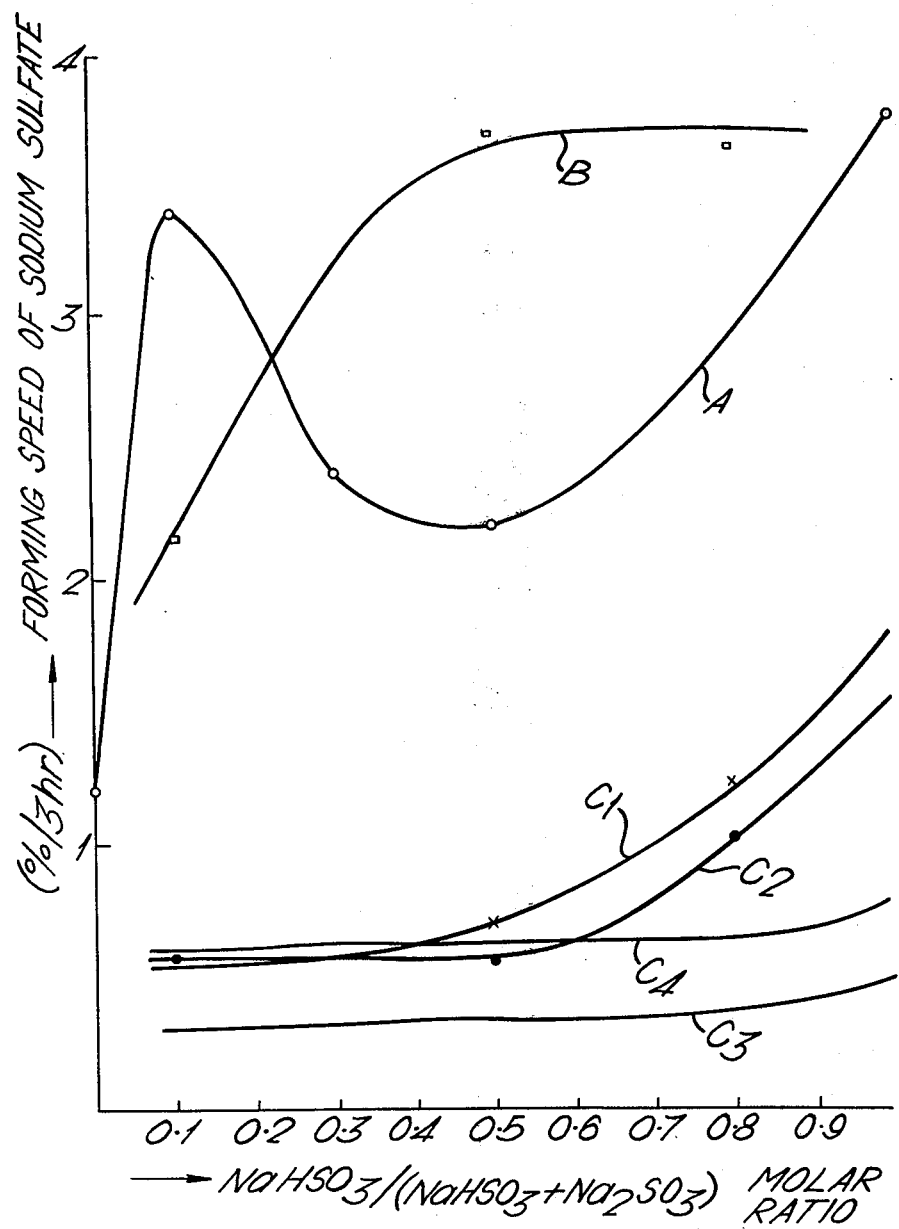

ANTIOXIDANT FOR THE AQUEOUS SOLUTIONS OF SULFITE AND/OR BISULFITE OF SODIUM OR POTASSIUM AND PROCESS FOR PREVENTING THE OXIDATION OF SAID AQUEOUS SOLUTION

BACKGROUND OF THE INVENTION

1. Field Of Invention

This invention relates to an antioxidant for aqueous solutions of sodium or potassium sulfite and/or bisulfite and a process for preventing oxidation and relates more particularly to the antioxidant used to prevent oxidation of such solutions to the sulfate and the process for preventing the oxidation of the aqueous solution of said salts by employing said antioxidant.

2. Description Of Prior Art

In recent years, various methods have been suggested and used to remove sulfur dioxide from waste gas to minimize air pollution. One comprises washing waste gas with an aqueous solution of sodium or potassium hydroxide and thereby absorbing the sulfur dioxide. While this method is an efficient way to desulfurize and has advantages such as the high rate of desulfurization and the easy way to treat the solution, sodium sulfate or potassium sulfate are produced by the oxidation reaction as a large amount of oxygen contained in waste gas dissolves into the absorbing solution in an absorption column. When sodium or potassium hydroxide absorb sulfur dioxide, it becomes sulfite and, when further sulfur dioxide is absorbed it is converted into the corresponding bisulfite. This bisulfite will regenerate sulfite by liberating sulfur dioxide when it is heated and it is possible to recycle it. The reactions for the sodium hydroxide are as follows:

$$2NaOH + SO_2 \rightarrow Na_2SO_3 + H_2O \text{ (absorption)}$$

$$Na_2SO_3 + SO_2 + H_2O \rightarrow 2NaHSO_3 \text{ (absorption)}$$

$$2NaHSO_3 \rightarrow Na_2SO_3 + SO_2\ H_2O \text{ (regeneration)}$$

When oxygen is present in this system, sodium sulfate is produced by oxidation of the sulfite or bisulfite. As sodium sulfate cannnot be regenerated, it must be purged and fresh sodium hydroxide supplied. The reactions are as follows:

$$Na_2SO_3 + \tfrac{1}{2} O_2 \rightarrow Na_2SO_4$$

$$2NaHSO_3 + \tfrac{1}{2} O_2 \rightarrow Na_2SO_4 + SO_2 + H_2O$$

Since the amount and cost of sodium hydroxide increases as a result of sodium sulfate being produced, methods to prevent oxidation are desirable. Although hydroquinone, phenol, ethyleneglycol and the like have been proposed as antioxidants for these sulfites and/or bisulfites, they are not effective enough.

Accordingly, it is an object of this invention to provide an antioxidant which will effectively prevent oxidation of the aqueous solutions of sodium or potassium sulfites and/or bisulfites.

A further object of this invention is to provide a method for washing waste gas to remove sulfur dioxide therefrom without producing undesirable sulfates within the absorbent solution.

SUMMARY OF THE INVENTION

In practicing the invention there is provided an antioxidant for the aqueous solution of sulfites and/or bisulfites of sodium or potassium which comprises at least one compound selected from the group consisting of 1. substituted phenols represented by the formula:

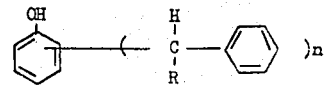

I wherein R is a lower alkyl group and $n$ is an integer of from 1 to 5.

2. tris (alkylphenyl) phosphates represented by the formula:

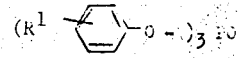

II wherein $R^1$ is an alkyl group having 6–18 carbon atoms.

3. trialkyl phosphites represented by the formula:

$$(R^2 - O - )_3 P$$

III wherein $R^2$ is an alkyl group having 8–18 carbon atoms.

4. glycerin monofatty acid esters represented by the formula:

$$R^3COOCH_2CH(OH)CH_2OH$$

IV wherein $R^3$ is an alkyl group having 8–22 carbon atoms.

Examples of the alkyl group represented by R are lower alkyl groups such as methyl, ethyl, butyl, propyl, etc. Examples of the alkyl group represented by $R^1$ are hexyl, octyl, nonyl, dodecyl, tetradecyl, hexadecyl, octadecyl, and the like. Examples of the alkyl group represented by $R^2$ are octyl, nonyl, dodecyl, tetradecyl, hexadecyl, octadecyl, and the like. Examples of the alkyl group represented by $R^3$ are octyl, nonyl, decyl, dodecyl, tetradecyl, hexadecyl, octadecyl, eicosyl, docosyl, and the like. These antioxidants may be employed separately or as a mixture of one or more of them.

The concentration of sulfite and/or bisulfite in aqueous solution is not particularly limited, but is usually in the range of 5 – 40% by weight calculated as sulfite. The amount of antioxidant added to these solution is in the range of 1–5000 ppm based on the weight of the aqueous solution and preferably in the range of 10–500 ppm.

Although the antioxidants of this invention may be added as such to the aqueous sulfite and/or bisulfite solutions, usually they are first dissolved in the appropriate amount of an organic solvent such as alcohols, ethers, ketones, amines, esters, and the like which can dissolve the antioxidant and are water-soluble. Then the solution of antioxidant is added to the aqueous sulfite and/or bisulfite solutions.

In the accompanying drawing constituting a part hereof, the FIGURE shows the rate at which sodium sulfate is formed when air at 3 liters/min. is blown through 150 ml. of aqueous solutions of various ratios of sodium sulfite to bisulfite.

In the FIGURE, curve A is a control wherein no antioxidant is used. Curve B shows the use of 50ppm (based on the mixed aqueous solution) of hydroquinone, the antioxidant of the prior art. Curves $C_1$ to $C_4$ use the antioxidants of this invention at a concentration of 50 ppm. These curves set forth the results of No. 1 of Example 1, No. 1 of Example 2, No. 6 of Example 1, and No. 2 of Example 2 respectively. The FIGURE shows that when the antioxidants of this invention are used, the rate of formation of sodium sulfate is slow and it is clear that the antioxidative action is especially good. As is apparent from curve A, the oxidizing speed is greatly influenced by changes in the ratio of sodium sulfite to sodium bisulfite in the solution.

In the practical case of the absorption of sulfur dioxide, it appears that the rate of formation of sodium sulfate changed along with the quick change of the composition of absorbent solution in the absorption column. Accordingly, an antioxidant is desired which can control the rate of formation of sodium sulfate even when the composition of the absorbent solution changes.

However, antioxidants of prior art such as hydroquinone, phenol, ethyleneglycol, mannitol, and the like evidence only a slight antioxidative effect in the range of these particular compositions of the absorbent solutions. For example, in the case of hydroquinone, as curve B shows, the antioxidative effect can be observed only when the molar ratio of $NaHSO_3/(NaHSO_3+Na_2SO_3)$ is from 0 to 0.2. Outside of this range, it promotes rather than inhibits the oxidation.

On the other hand, the antioxidants of the present invention do not have these disadvantages. Compounds like hydroquinone change to quinone when they come in contact with oxygen as, for example, by the reaction

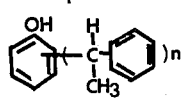

The aqueous solution of sulfite and/or bisulfite of sodium or potassium which absorbed sulfur dioxide can be recycled and regenerated by evaporation. However, since the quinones liberate oxygen during this evaporating process, the amount of sodium sulfate produced increases more than if no antioxidant is added. However, when the antioxidants of this invention are used, there is no oxidation during regeneration and the production of sodium sulfate is prevented.

BRIEF DESCRIPTION OF THE DRAWING

The attached FIGURE discloses the antioxidative effect of the antioxidant of this invention. The curves $C_1$ to $C_4$ are the results of the use of the antioxidants of this invention. Curve A is the control using no antioxidant, and curve B is the result of the use of hydroquinone, the antioxidant of the prior art.

DESCRIPTION OF THE PREFERRED EMBODIMENTS

In the examples, % and parts mean weight % and parts by weight.

EXAMPLE 1

The antioxidant shown was dissolved in the indicated organic solvent and was added to 200 parts of an aqueous solution of 13% $Na_2SO_3$, 2% $NaHSO_3$ and 85% water. The solution was then aerated at the rate of 3 liters/min. The results are shown in Table 1.

Table 1

| | NO. | 1 | 2 |
|---|---|---|---|
| antioxidant | kind | Styrenated phenol 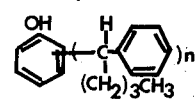 Mixture of about 90%, n=1 of the above and about 10%, n=2 – 5 of the above. | Styrenated phenol 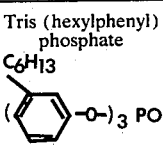 Mixture of about 15%, n=1 – 2 of the above and 85%, n=3 – 5 of the above. |
| | quantity (parts) | 0.01 | 0.01 |
| solvent | kind | acetone | acetone |
| | quantity (parts) | 0.01 | 0.04 |
| solution quantity prepared (parts) | | 200 | 200 |
| solution quantity after aeration (parts) | | 198 | 197 |
| analyzed result | $Na_2SO_3$ (%) | 12.75 | 12.63 |
| | $NaHSO_3$ (%) | 1.92 | 1.95 |
| | $Na_2SO_4$ (%) | 0.41 | 0.45 |
| | $H_2O$ (%) | 84.92 | 84.97 |

| | 3 | 4 | 5 | 6 |
|---|---|---|---|---|
| | Tris (hexylphenyl) phosphate 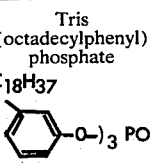 | Tris (octadecylphenyl) phosphate | Trioctyl phosphite $(C_8H_{17}O)_3$ P | Tridecyl phosphite $(C_{10}H_{21}O)_3$ P |
| | 0.01 | 0.03 | 0.01 | 0.01 |
| | acetone | benzene | acetone | acetone |
| | 0.01 | 0.03 | 0.01 | 0.01 |
| | 200 | 200 | 200 | 200 |
| | 197 | 198 | 196 | 198 |
| | 12.55 | 12.63 | 12.47 | 12.93 |
| | 1.90 | 1.93 | 1.95 | 1.96 |
| | 0.57 | 0.46 | 0.63 | 0.27 |
| | 84.98 | 84.98 | 84.95 | 84.90 |

Table 1 — Continued

| 7 | 8 | 9 | 10 |
|---|---|---|---|
| Trioctadecyl phospite $(C_{18}H_{37}O)_3$ P | Glycerin monononanate $C_8H_{17}$.COOCH$_2$.CH.CH$_2$OH<br>　　　　　　　　OH | Glycerin monotricosanate $C_{22}H_{45}$.COOCH$_2$.CH.C-H$_2$OH<br>　　　　　　OH | without antioxidant |
| 0.02 | 0.01 | 0.03 | — |
| acetone | benzene | benzene | |
| 0.04 | 0.05 | 0.15 | — |
| 200 | 200 | 200 | — |
| 197 | 197 | 198 | — |
| 12.53 | 12.45 | 12.72 | 10.46 |
| 1.89 | 1.90 | 1.93 | 1.84 |
| 0.60 | 0.68 | 0.47 | 3.23 |
| 84.98 | 84.97 | 84.88 | 84.47 |

EXAMPLE 2

A premixed solution of 0.01 parts of tris (nonylphenyl) phosphate or glycerin monostearate and 0.01 parts of acetone is added as an antioxidant to 200 parts of aqueous solution composed of 17% $Na_2SO_3$, 15% $NaHSO_3$, 0.5%, $Na_2SO_4$ and 67.5% water. The solution is then aerated for 3 hours at the rate of 3 liters/min. The analysis of the resulting 196 parts of aqueous solution is shown in Table 2. For comparison, the results when no antioxidant is used are also set forth.

Table 2

| analyzing items | antioxidant | | |
|---|---|---|---|
| | No. 1<br>Tris (nonylphenyl) phosphate<br> | NO. 2<br>Glycerin monostearate $C_{17}H_{35}$.COOCH$_2$.CH.CH$_2$OH<br>　　　　　　　　OH | NO. 3<br>without antioxidant |
| $Na_2SO_3$ (%) | 16.75 | 16.93 | 15.50 |
| $NaHSO_3$ (%) | 14.90 | 14.85 | 14.66 |
| $Na_2SO_4$ (%) | 0.89 | 0.68 | 2.63 |
| $H_2O$ (%) | 67.46 | 67.54 | 67.21 |

Table 3

| | with antioxidant | without antioxidant |
|---|---|---|
| $K_2SO_3$ (%) | 9.70 | 6.53 |
| $KHSO_3$ (%) | 13.53 | 13.00 |
| $K_2SO_4$ (%) | 0.21 | 2.52 |
| $H_2O$ (%) | 76.56 | 77.95 |

In the above case, $SO_2$ in the waste gas from combustion of heavy oil after aeration is 300 ppm.

EXAMPLE 3

A premixed solution of 0.05 parts of acetone and 0.05 parts of Styrenated phenol

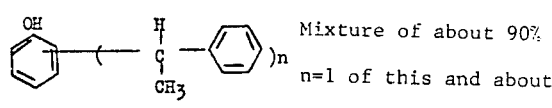

Mixture of about 90% n=1 of this and about 10%, n=2 - 5 of this as an antioxidant is added to 600 parts of aqueous solution composed of 21% $K_2SO_3$, 5% $KHSO_3$, and 74% water. The phenol was about 90% wherein $n=1$ and about 10% where $n=2$ to 5. Waste gas from combustion of heavy oil and containing 0.3 vol % $SO_2$ was aerated for 5 hours at the rate of 15 liters/min. The analysis of the resulting 573 parts of aqueous solution is shown in Table 3. For comparison, the results of the control (without adding antioxidant) are also set forth.

What is claimed is:

1. A composition for the absorption of sulfur dioxide which comprises antioxidant and aqueous solutions of sodium or potassium sulfite or bisulfite or mixtures thereof, said antioxidant being taken from the class consisting of 1. substituted phenols represented by the formula:

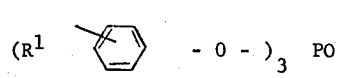

wherein R is a lower alkyl group and $n$ is an integer of from 1 to 5

2. tris (alkylphenyl) phosphates represented by the formula:

$(R^1 - \text{C}_6\text{H}_4 - O -)_3 PO$ wherein R¹ is an alkyl group having 6–18 carbon atoms 3. trialkyl phosphites represented by the formula:

$$(R^1 - O -)_3 P$$

wherein R² is an alkyl group having 8–18 carbom atoms 4. glycerin monofatty acid esters represented by the formula:

$$R^3 COOCH_2CH(OH)CH_2OH$$

wherein R³ is an alkyl group having 8–22 carbon atoms
said antioxidant being present in an amount of 1 to 5000 ppm based on the weight of said solutions.

2. The method for absorbing and removing sulfur dioxide from waste gas which comprises contacting waste gas containing sulfur dioxide with a composition containing aqueous solutions of sodium or potassium sulfite or bisulfite or mixtures thereof and 1 to 5000 ppm based on the weight of said solutions of an antioxidant taken from the class consisting of 1. substituted phenols represented by formula:

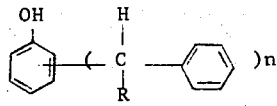

wherein R is a lower alkyl group and n is an integer of from 1 to 5

2. tris (alkylphenyl) phosphates represented by the formula:

wherein R¹ is an alkyl group having 6–18 carbon atoms 3. trialkyl phosphites represented by the formula:

$$(R^2 - O -)_3 P$$

wherein R² is an alkyl group having 8–18 carbon atoms 4. glycerin monofatty acid esters represented by the formula:

$$R^3 COOCH_2CH(OH)CH_2OH$$

wherein R³ is an alkyl group having 8–22 carbon atoms.

3. The method according to claim 2 wherein said solutions contain 5 to 40% by weight calculated as sulfite of said sulfite and/or bisulfite.

4. The method according to claim 2 in which said amount is 10 – 500 ppm.

5. The method according to claim 2 comprising first dissolving said antioxidant in a water soluble organic solvent which is also a solvent for said antioxidant and then adding said antioxidant-solvent to said solutions.

6. The method according to claim 2 wherein said solvent is taken from the class consisting of alcohols, ethers, ketones, amines and esters.

7. A composition according to claim 1 in which tris (nonylphenyl) phosphate is employed as the antioxidant.

8. The method according to claim 2 in which tris (nonylphenyl) phosphate is employed as antioxidant.

9. The method according to claim 2 in which said antioxidant is tris (nonylphenyl) phosphate.

10. The method of claim 2 in which the antioxidant is glycerine monostearate.

* * * * *